(12) United States Patent
Van Vlierberghe

(10) Patent No.: US 12,510,412 B2
(45) Date of Patent: Dec. 30, 2025

(54) METHOD AND SYSTEM FOR DETERMINING A TEMPERATURE VALUE OF A MOLTEN METAL BATH

(71) Applicant: Heraeus Electro-Nite International N.V., Houthalen (BE)

(72) Inventor: Michel Van Vlierberghe, Houthalen (BE)

(73) Assignee: HERAEUS ELECTRO-NITE INTERNATIONAL N.V., Houthalen (BE)

(*) Notice: Subject to any disclaimer, the term of this patent is extended or adjusted under 35 U.S.C. 154(b) by 390 days.

(21) Appl. No.: 18/254,768

(22) PCT Filed: Dec. 1, 2021

(86) PCT No.: PCT/EP2021/083731
§ 371 (c)(1),
(2) Date: May 26, 2023

(87) PCT Pub. No.: WO2022/117627
PCT Pub. Date: Jun. 9, 2022

(65) Prior Publication Data
US 2024/0027272 A1 Jan. 25, 2024

(30) Foreign Application Priority Data
Dec. 2, 2020 (EP) .................................. 20211284

(51) Int. Cl.
*G01J 5/00* (2022.01)
*G01J 5/08* (2022.01)
*G01J 5/0821* (2022.01)

(52) U.S. Cl.
CPC ............. *G01J 5/004* (2013.01); *G01J 5/0821* (2013.01); *G01J 5/084* (2013.01)

(58) Field of Classification Search
CPC .......... G01J 5/004; G01J 5/0821; G01J 5/084; G01J 5/026; G01J 5/048; G01J 5/00; G01J 5/08; G01J 5/02; G01J 5/04
See application file for complete search history.

(56) References Cited

U.S. PATENT DOCUMENTS

| | | | |
|---|---|---|---|
| 4,454,748 A * | 6/1984 | Terai .................. | G01N 33/2025 73/19.07 |
| 4,737,038 A * | 4/1988 | Dostoomian .......... | G01J 5/041 374/139 |
| 2007/0268477 A1 | 11/2007 | Dams et al. | |

(Continued)

FOREIGN PATENT DOCUMENTS

| | | | |
|---|---|---|---|
| DE | 20008622 U1 * | 8/2000 | ................ G01J 3/02 |
| EP | 0646778 A1 | 4/1995 | |
| EP | 1857792 A1 | 11/2007 | |

(Continued)

*Primary Examiner* — Laura Martin
*Assistant Examiner* — Julia Fitzpatrick
(74) *Attorney, Agent, or Firm* — Blank Rome LLP

(57) ABSTRACT

The present invention relates to a method and a system for determining a temperature value of a molten metal bath. The method according to the invention has been proven to be especially suitable for repeated determinations of temperature values; i.e. the method allows for multiple measurements with repeatedly newly generated leading tips of the optical cored wire.

15 Claims, 2 Drawing Sheets

(56) References Cited

U.S. PATENT DOCUMENTS

2018/0180484 A1    6/2018  Kendall et al.

FOREIGN PATENT DOCUMENTS

| | | | | |
|---|---|---|---|---|
| EP | 2554959 | A1 * | 2/2013 | ................ G01J 5/00 |
| EP | 2799824 | A1 | 11/2014 | |
| EP | 3339823 | A1 | 6/2018 | |
| FR | 2776382 | A1 * | 9/1999 | ................ G01J 5/60 |
| JP | H09243459 | A | 9/1997 | |
| JP | H09304185 | A | 11/1997 | |
| JP | H10176954 | A | 6/1998 | |
| JP | H10185698 | A | 7/1998 | |
| JP | 2010071666 | A | 4/2010 | |
| LU | 87522 | A1 * | 12/1990 | ................ G01K 1/14 |
| RS | 56309 | B1 * | 12/2017 | ................ G01J 5/042 |
| WO | 2016026530 | A1 | 2/2016 | |

* cited by examiner

METHOD AND SYSTEM FOR DETERMINING A TEMPERATURE VALUE OF A MOLTEN METAL BATH

The present invention relates to a method and a system for determining a temperature value of a molten metal bath.

The temperature of a molten metal bath in a metallurgical vessel is a critical parameter during the metal making process, which determines the quality of the resulting product. A possible means for measuring the temperature of the molten metal bath, particularly of iron or steel in a melting environment of an electric arc furnace (EAF), involves immersing an optical fiber surrounded by a metal tube into the molten metal. An optical fiber surrounded by a metal tube is often also referred to as optical cored wire.

For measuring the temperature of the molten metal bath, the optical cored wire can be fed into the metallurgical vessel. The leading tip of the optical cored wire is immersed into the molten metal bath, encountering on its way a hot atmosphere first, followed by a slag layer and then the molten metal bath. Once a portion of the optical cored wire is immersed below the surface of the molten metal bath, the optical fiber can convey thermal radiation received from the molten metal to a detector, e.g. a pyrometer. Suitable instrumentation can be associated with the detector for determining the temperature of the molten metal bath. During this measurement, the immersed portion of the optical cored wire may be partly or completely consumed by the molten metal bath. Once the temperature measurement has been concluded, the tip of the optical cored wire can be retracted from the molten metal bath. The tip of the retracted optical cored wire will become the new leading tip for the next temperature measurement.

Such a device is suitable for on-demand and semi-continuous temperature measurements in form of a series of immersion cycles. An operator can obtain a temperature measurement without any direct intervention with the harsh environment proximate to the metallurgical vessel.

To provide accurate measurements, blackbody conditions must be ensured in the vicinity of the immersed leading tip of the optical fiber while a measurement is obtained. The fiber must be immersed to a sufficient depth below the metal bath surface and at a location within the vessel which is representative for the temperature of the liquid metal bath. On the other hand, a deep immersion will increase the flotational forces on the optical cored wire and increase the consumption during a measuring sequence.

The availability of an unvitrified optical fiber is essential for an accurate temperature measurement. Especially the condition of the leading tip is crucial. The devitrification rate is dependent on a variety of factors, among them the construction of the optical cored wire, the thermal environment of the metallurgical vessel to which the optical cored wire is exposed before, during and after each measurement cycle, the amount and type of slag layer covering the molten metal bath as well as the actual condition and temperature of the molten metal bath.

Many of the devices known in the prior art are commonly constructed by using an optical fiber located in a protective tube. The void space between the optical fiber and the metal tube may be filled with a filler material to further protect the optical fiber from the harsh environment and the heat of the molten metal bath prior to immersion and data collection. The layered structure aids in keeping the optical fiber at a low temperature for a relatively long time. Devitrification from elevated temperatures that will destroy the optical fiber is delayed. For example, JPH10176954A describes a fiber which is surrounded with a spacing by a metal tube. Arranged around this metal tube is a tube made of an insulating coating which in turn is surrounded by an outer metal tube. This structure prevents the inner metal tube from melting too quickly.

The exposure of the optical cored wire to the environment in the metallurgical vessel becomes a prominent problem in the cases where a series of measurements is conducted. In such cases, the thermal exposure of the optical fiber does not only occur in the time frame shortly before a measurement is obtained, but also in the interval between measurements.

For these multiple immersions, JPH09243459A teaches an additional corrective action during which potentially damaged immersed optical fiber is cut away from the supply after each measurement cycle to provide a fresh leading tip prior to every measurement. While this solution solves the problem of the use of damaged parts of the optical fiber, additional equipment is needed and the extent of devitrified portion of the fiber is unknown.

Additionally, a variety of schemes to feed consumable optical fibers into molten metal bath have been proposed to provide an optical fiber core to the molten metal before its devitrification.

For example, JP09304185A discloses a method to feed an optical fiber wherein the speed of fiber consumption must be greater than the rate of devitrification. The scheme comprises two feeding steps with an intermitting waiting period, wherein the first feeding is conducted until a pre-set threshold temperature is recorded. Subsequently, temperature measurements obtained during each feeding step are compared to determine whether additional measurement cycles are needed.

US2007268477A1 discloses a method of feeding where the speed of feeding is adjusted during the measurement cycle. A thermal response is recorded during an initial feeding phase and compared to the change in detected temperature in a following second phase. While this method offers some advantages, it does not address the fact that during the initial phase, the optical cored wire is mostly not immersed in the molten metal bath but encounters the environment of the melting furnace or the slag layer, leading to incorrect results.

Several prior art documents disclose feeding methods for a metal coated optical fiber, which is additionally encased by a movable guiding tube prior to the immersion in the molten metal. For example, JP2010071666A discloses a first phase during which fiber and guiding tube are fed from a retracted position to the vicinity of the molten metal bath surface in 3 steps with decreasing speeds. Subsequently, the fiber is fed into the bath and the temperature may be recorded. In JPH10185698A, the feeding of the optical fiber is additionally controlled by several means, among others based on a feedback on the rate of increase of the measured temperature and predetermined time durations.

While these solutions provide a long-lasting protective environment for the fiber and a low demand on fiber consumption, additional equipment is required.

US2018180484A1 discloses a method for measuring the temperature of a molten metal bath suitable for multiple measurement cycles and without the requirement for additional equipment. The proposed feeding scheme comprises two feeding velocities followed by a stationary period, after which the temperature measurement is conducted. On the one hand, this method solves some of the problems known before for certain conditions in a metallurgical process. On the other hand, it does not address the exact level of the metal bath. Since the first feeding needs to ensure that the leading tip of the optical cored wire is immersed below the molten metal bath surface, the amount of optical cored wire consumed during a measurement cycle may be higher than necessary.

In view of the prior art, there is a need for a measurement method and a system which provides high accuracy over the entire range of possible conditions prevailing in the processing of molten metals, like in particular the variety of parameters of molten metal baths and construction details of different metallurgical vessels.

The object of the invention is thus to provide an improved method for determining a temperature value of a molten metal bath with an optical cored wire which solves at least one of the problems discussed above. In particular, one of the objects is to provide an improved method to more reliably determine temperature values over a broad variety of application conditions. Specifically, the object is to improve the melting and decomposition behavior of the optical cored wire during and after the determination of a temperature value. Another object is to provide a method which allows to minimize the consumption of optical cored wire during the determination. Furthermore, it is an object to provide a method to obtain the temperature value at a certain immersion depth of the optical cored wire.

A further object of the invention is to provide an improved system for carrying out the inventive method.

These objects are attained by the subject-matter defined in the independent claims.

The invention provides a method for determining a temperature value of a molten metal bath with a device comprising an optical cored wire and a detector, the method comprising
(a) providing the optical cored wire with its leading tip at a position p1 above the surface of the molten metal bath;
(b) feeding the leading tip directed towards the molten metal bath from position p1 with a velocity v1 for a first time period from t1 to t2 to a position p2 in an immersion depth i1 below the surface of the molten metal bath;
(c) feeding the leading tip with a velocity v2 for a second time period from t2 to t3 to a position p3 in an immersion depth i2 below the surface of the molten metal bath;
(d) feeding the leading tip with a velocity v3 for a third time period from t3 to t4 to a position p4 in an immersion depth i3 below the surface of the molten metal bath;
(e) either pausing with the feeding of the leading tip or feeding the leading tip with a velocity v4, each for a fourth time period from t4 to t5;
(f) retracting the leading tip with a velocity v5 to a position above the surface of the molten metal bath after t5,
(g) obtaining temperature information of the molten metal bath within a measuring time period within t2 to t5,
wherein the immersion depth and velocities have the following relations
(i) i2>i1,
(ii) i3>i2,
(iii) v1>v2,
(iv) v2<v3 and
(v) v4<v1 or v2 or v3.

To prevent any misunderstanding, the positions p1, p2, p3 and p4 mentioned in steps (a) to (d) and the position above the surface of the molten metal bath mentioned in step (f) are positions of the leading tip of the optical cored wire. The skilled person will understand that "providing the leading tip" and "feeding the leading tip" necessarily includes providing and feeding the optical cored wire, i.e. providing the optical cored wire having a leading tip and moving the optical cored wire with its leading tip to said positions.

The points in time t1, t2, t3, t4 and t5 directly follow on each other; i.e. with no interval in between.

Furthermore, the invention provides a system for carrying out the method according to the invention.

Preferred embodiments are defined in the dependent claims. The preferred embodiments may be realized individually or in any possible combination.

The method according to the invention has been proven to be especially suitable for repeated determinations of temperature values; i.e. the method allows for multiple measurements with repeatedly newly generated leading tips of the "endless" optical cored wire. Since the inventive method allows a reliable positioning of the leading tip of the optical cored wire it additionally allows to determine accurate temperature values with a minimal consumption of the optical cored wire. The term "consumption" as used herein refers to a disintegration of the optical cored wire, such as for example the melting and dissolution of the optical cored wire by and into the molten metal bath, a decomposition or burning of the whole optical cored wire or its different parts, and the like. In particular, the method according to the invention ensures that the leading tip of the optical cored wire is in an optimal condition for determining a temperature value at a position in a certain immersion depth.

The invention provides a method for determining a temperature value of a molten metal bath.

"Determining a temperature value" may be used herein as a synonym for measuring a temperature. It may be understood that it refers to acquiring a single point measurement, or to methods which comprise more than a single point measurement and the optional related data processing.

As used herein, the term "molten metal bath" is used to describe a melt in a vessel. An alternative term for "molten metal bath" known to a skilled person is "metal melt". The molten metal of the molten metal bath is not particularly restricted. According to a preferred embodiment, the molten metal is molten steel. The term molten metal bath does not exclude the presence of any solid or gaseous parts, including for example non-molten parts of the respective metal. The molten metal bath may be covered with a slag layer.

The temperature of metal melts differs and usually depends on the composition of the metal and the stage of the melting process. Preferably, the temperature of the molten metal bath is in the range of 1500-1800° C. and more preferably in the range of 1500-1700° C.

The molten metal bath may be contained in a vessel comprising an entry point, suitable to feed an optical cored wire through. Such an entry point may be positioned in a side-wall panel or a roof covering the vessel.

The invention provides a method for determining a temperature value with a device comprising an optical cored wire. Preferably, the optical cored wire is an optical fiber laterally surrounded by a metal tube.

Preferably, the optical fiber is a flexible, transparent fiber. Optical fibers are most often used as means to transmit light, especially in the IR wavelength range, between the two ends of the fiber. Preferably, the optical fiber is formed from glass or plastic, more preferably quartz glass. Preferably, the optical fiber is selected from the group consisting of graded index fibers and single-mode step index fibers.

The metal tube surrounding the optical fiber can fully encircle the optical fiber or it can be at least partially open so that the casing is not fully encircling the optical fiber.

Preferably, the metal of the metal tube surrounding the optical fiber is iron or steel, preferably stainless steel.

In a preferred embodiment the linear density of the optical cored wire is in the range of 25-80 g/m, even more preferably in the range of 35-70 g/m. The linear density is defined by the mass per unit length.

Preferably, the optical cored wire is laterally surrounded by at least one additional metal tube, i.e. at least two metal tubes surround the optical fiber laterally. More preferably, the optical cored wire is centrally arranged in the at least one additional metal tube.

Preferably, the at least one additional metal tube is not in contact with the optical cored wire. More preferably, the void space between these at least two metal tubes is at least partially filled with a material selected from the group consisting of gaseous or solid materials or a combination thereof. The solid material is preferably selected from the group consisting of inorganic materials, natural polymers, synthetic polymers and combinations thereof. The gaseous material is preferably a gas or a mixture of gases. More preferably, the gas is air or an inert gas.

According to a preferred embodiment, the optical cored wire comprises a plurality of separating elements arranged in the at least one metal tube, forming at least one compartment between the separating elements. Here, the term "compartment" relates to the volume between the different separating elements in the tube. The term "separating elements" relates to parts arranged inside the tube subdividing the volume within the tube. Preferably, separating elements are disc-shaped elements that are arranged inside the tube comprising an opening, through which the optical cored wire is extending and which can at least partly support the optical cored wire. The material of the separating elements is preferably selected from the group consisting of silicone, preferably two-component silicone, rubber, leather, cork, metal and combinations thereof.

The optical cored wire is optionally surrounded by at least one additional layer. This at least one additional layer may or may not replace said at least one additional metal tube. In a preferred embodiment, this at least one additional layer comprises a plurality of pieces, more preferably the layer comprises fibers.

In a further preferred embodiment, the material of the at least one additional layer has the form of a web, a net, a woven or a knitted structure.

Preferably, the at least one additional layer is made of a variety of materials. More preferably, the material is a non-metallic material, most preferably an organic material.

It is to be understood that the optical cored wire may comprise any combination of the above described configurations. For example, it may be advantageous, that the optical cored wire is laterally surrounded by an additional layer and a second metal tube.

The device used to apply the method according to the invention further comprises a detector. The detector may be coupled to one end of the optical cored wire and may receive a light signal, in particular in the IR wavelength range, transmitted by the optical fiber. A detector in the context of the present invention may be a pyrometer.

The optical cored wire has an immersion end and an opposite end. The leading tip of the optical cored wire is the tip of the immersion end of the optical cored wire. Preferably, when the method according to the invention is applied, the optical cored wire is consumed in the direction from the immersion end towards the opposite end and after each measuring sequence, another part of the optical cored wire will be the immersion end; i.e. after each measurement sequence the leading tip is newly generated. The opposite end is connected to the detector and will not be consumed during a measurement.

In step (a) of the method according to the present invention an optical cored wire is provided with its leading tip at a position p1 above the surface of the molten metal bath.

The surface of the molten metal can be the surface facing the gaseous atmosphere above that surface in the vessel or, in case of the presence of a slag layer, the surface facing the slag layer.

Position p1 may be above the vessel or preferably within the vessel. The leading tip at position p1 may or may not have contact with the optionally present slag.

In step (b) of the method according to the present invention the leading tip being directed towards the molten metal bath is fed from position p1 with a velocity v1 for a first time period from t1 to t2 to a position p2 in an immersion depth i1 below the surface of the molten metal bath.

A movement towards the molten metal bath may include a passage of the leading tip through the previously mentioned slag layer, which may or may not be present.

The immersion depth in terms of the present invention is to be understood as the distance of the leading tip from the surface of the molten metal bath and is determined along an axis perpendicular to the surface.

It may be advantageous, that the angle of immersion is in the range of 45-90°, preferably in the range of 60-90°, most preferably the angle of immersion is 90°. This angle is defined as the angle between the surface of the molten metal bath and an axis along the optical cored wire in an optimal straight line. 90° may be understood as an immersion of the optical cored wire perpendicular to the surface of the molten metal bath.

The angle of immersion is kept constant during the steps comprising a feeding; i.e. during steps (b), (c), (d) and (e).

In a preferred embodiment, v1 is in the range of 2-4 m/s, more preferably in the range of 2.5-3.5 m/s.

According to a preferred embodiment, i1 is in the range of 0.01-0.35 m below the surface of the molten metal bath, more preferably in the range of 0.05-0.35 m.

Preferably, the duration of the first time period from t1 to t2 is in the range of 0.1-1 s, preferably in the range of 0.25-0.75 s.

In step (c) of the method according to the present invention the leading tip is fed with a velocity v2 for a second time period from t2 to t3 to a position p3 in an immersion depth i2 below the surface of the molten metal bath.

According to the invention, i2>i1; i.e. i2 is deeper below the surface of the molten metal bath than i1.

According to the invention, velocity v2 is lower than velocity v1.

In a preferred embodiment, v2 is in the range of 0.05-0.5 m/s, more preferably in the range of 0.1-0.3 m/s.

According to a preferred embodiment, i2 is in the range is in the range of 0.05-0.4 m, more preferably in the range of 0.1-0.3 m.

In a preferred embodiment, the duration of the second time period from t2 to t3 is in the range of 0.2-2.0 s, preferably in the range of 0.3-1.5 s.

In step (d) of the method according to the present invention the leading tip is fed with a velocity v3 for a third time period from t3 to t4 to a position p4 in an immersion depth i3 below the surface of the molten metal bath.

According to the invention, i3>i2; i.e. i3 is deeper below the surface of the molten metal bath than i2, and velocity v2 is lower than velocity v3.

Advantageously, v3 is in the range of 0.5-4.5 m/s, preferably in the range of 1.5-3.5 m/s.

According to a preferred embodiment, i3 is in the range of 0.1-1.0 m, more preferably in the range of 0.2-0.8 m.

In a preferred embodiment, the duration of the third time period from t3 to t4 is in the range of 0.05-0.45 s, preferably in the range of 0.05-0.25 s.

According to a preferred embodiment, v1 and v3 are both higher than v2.

In step (e) of the method according to the present invention either the feeding of the leading tip is paused with, or the leading tip is fed with a velocity v4, each for a fourth time period from t4 to t5.

The term "pausing with the feeding of the leading tip" used herein means, that the leading tip is not actively moved.

In the alternative embodiment, the leading tip is fed with a velocity v4. Preferably, velocity v4 is lower than the velocity with which the leading tip of the optical cored wire moves back in direction of the surface of the molten metal bath due to a certain consumption of the optical cored wire during melting.

Both alternatives result in a movement of the position of the leading tip towards the surface of the molten metal bath due to the consumption. Nevertheless, the leading tip is still immersed below the surface of the molten metal bath.

Preferably, the entire part of the optical cored wire fed below the surface of the molten metal bath during t1 to t5 is fully consumed until t5.

According to a preferred embodiment, v4 is lower than 0.2 m/s, more preferably lower than 0.1 m/s.

In a preferred embodiment, the duration of the third time period from t4 to t5 is in the range of 0.05-0.5 s, preferably in the range of 0.1-0.4 s.

In a preferred embodiment, the duration of the fourth time period from t4 to t5 is selected by a method comprising
   (i) providing a set of data relating measured data of a molten metal bath to durations;
   (ii) obtaining a measurement in a time period prior to t4;
   (iii) selecting from the provided set of data the duration of the fourth time period corresponding to the measured data obtained during the time period prior to t4.

The term "set of data" is used herein as a database containing corresponding data, i.e. such a set comprises data pairs in which one certain value of a type of data is assigned to a certain value of another type of data. It may also comprise data pairs in which one certain value of a type of data is assigned to a model, a sequence of several steps or the like.

Preferably, the measured data comprises temperature values. More preferably, the measured data is a series of temperature values. Most preferably, the measured data is the slope of a function describing the series of temperature values.

Advantageously, the duration of the fourth period is the shorter the higher the temperature values obtained during the time period prior to t4 are.

In step (f) of the method according to the present invention the leading tip is retracted with a velocity v5 to a position above the surface of the molten metal bath after t5; i.e. the leading tip is moved backwards towards position p1.

The retracting of step (f) may or may not result in a positioning of the leading tip at position p1.

Preferably, v5 is in the range of 2-4 m/s, more preferably in the range of 2.5-3.5 m/s.

In step (g) of the method according to the present invention temperature information of the molten metal bath is obtained within a measuring time period within t2 to t5.

"Obtaining temperature information" is used herein to describe a step resulting in the determination of a temperature value. It may comprise the measurement of a single data point or the measurement of more than one data point; i.e. the measurement of a series of data points.

Preferably, obtaining temperature information comprises the measurement of a series of data points.

The determined temperature may be the mean value of the series of data points. In a further embodiment, the obtained temperature maybe derived based on the application of an algorithm processing the series of data points.

Preferably, the temperature information is obtained within a measuring time period within t3 to It may be advantageous, that the start of the measuring time period is later than or equal to $t3+(t4-t3)/2$.

It may be advantageous, that the end of the measuring time period is earlier than or equal to $t4+(t5-t4)/2$.

In a preferred embodiment, at least one of the velocities v1, v2 or v3 is selected based on the characteristics of the optical cored wire, in particular based on the wall thickness of the tube, the material of the compounds, the specific design or a combination thereof.

"Specific design" refers for example to the selected combination of embodiments referring to the optical cored wire mentioned above; i.e. among others the selection of layers and materials.

In another preferred embodiment at least one of the velocities v1, v2 or v3 is selected by a method comprising
   (i) providing sets of data relating expected temperatures of a molten metal bath to velocities for v1, v2 or v3;
   (ii) providing an expected temperature value of the molten metal bath;
   (iii) selecting from the provided sets of data at least one of the velocities for v1, v2 or v3 corresponding to the expected temperature.

An expected temperature may be understood as a temperature which is not measured or determined, i.e. a temperature which is for example obtained based on empirical data. Such empirical data may be the characteristics of the metal molten metal bath or the operational parameters of the metal producing process, such as the energy which was provided for the melting process or the duration of the process. The characteristics of the molten metal bath include the physical properties of the molten metal bath, for example the charged mass of the molten metal or the composition of the metal.

In a preferred embodiment, at least one of the durations of the first, the second, the third or the fourth time period is selected based on the characteristics of the optical cored wire, in particular based on the wall thickness of the tube, the material of the compounds, the specific design or a combination thereof.

In another preferred embodiment at least one of the durations of the first, the second, the third or the fourth time period is selected by a method comprising
   (i) providing sets of data relating expected temperatures of a molten metal bath to durations for the first, the second, the third and the fourth time period;
   (ii) providing an expected temperature value of the molten metal bath;
   (iii) selecting from the provided sets of data at least one of the durations for the first, the second, the third and the fourth time period corresponding to the expected temperature.

In a preferred embodiment, at least one of the immersion depths i1, i2 or i3 is selected based on the characteristics of the optical cored wire, in particular based on the wall thickness of the tube, the material of the compounds, the specific design or a combination thereof.

In another preferred embodiment at least one of the immersion depths i1, i2 or i3 is selected by a method comprising
(i) providing sets of data relating expected temperatures of a molten metal bath to immersion depths for i1, i2 or i3;
(ii) providing an expected temperature value of the molten metal bath;
(iii) selecting from the provided sets of data at least one of the immersion depths for i1, i2 or i3 corresponding to the expected temperature.

Preferably, the method may further comprise a step (a1), wherein the level of the surface of the molten metal bath is determined.

A broad variety of methods for determining the level of a molten metal bath is known to a skilled person. Such methods include for example the determination of the loaded mass of raw material in conjunction with the known density of the molten material and the design of the vessel, contact based measurements such as the utilization of a dipping lance or contact sensors, non-contact based determinations which may be based on radar or microwaves, as well as indirect methods like the measurement of the pressure inside the vessel.

Preferably, step (a1) is carried out prior to step (a).

The present invention further relates to a system for carrying out the method according to the invention.

For preferred embodiments related to the inventive method, it is referred to the preferred embodiments given above.

Preferably, the system comprises the afore mentioned device comprising an optical cored wire and a detector.

In an embodiment, the system may comprise feeding means. In the context of the present invention, feeding means may be understood as means which allow the feeding of the optical cored wire into the molten metal bath. Such means may be selected from the group consisting of a feeder, a feeding control, a straightener and a guiding tube.

In a variant of the embodiment, the system also comprises control means. The control means are configured to control the operation of the device to carry out the method as described above. The control means may comprise hardware, a memory unit and a processing unit. According to a preferred embodiment, the system may further comprise a coil, which accommodates the length of the optical cored wire.

The idea underlying the invention shall subsequently be described in more detail with respect to the embodiments shown in the figures. It should be understood, however, that the invention is not limited to the precise arrangements and instrumentalities shown. Herein:

Figure 1:
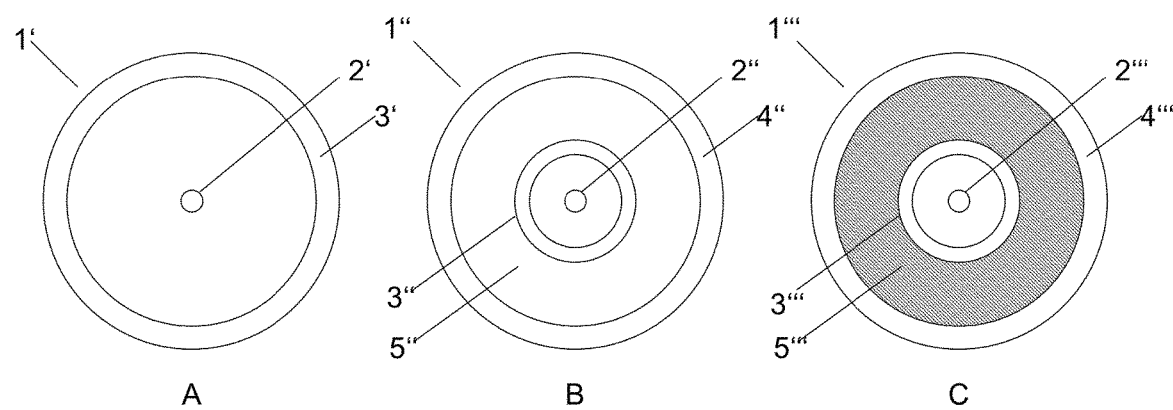
FIG. 1 shows schematic cross-sectional views of different designs of optical cored wires.

FIG. 1 shows schematic cross-sectional views of different designs of optical cored wires in accordance with exemplary embodiment of the invention. FIG. 1A shows an optical cored wire 1' which comprises an optical fiber 2' surrounded by a metal tube 3'.

FIG. 1 B shows an optical cored wire 1" which comprises an optical fiber 2" surrounded by a metal tube 3". A second metal tube 4" additionally surrounds metal tube 3". The void space between the two metal tubes 5" is not filled with a solid material; i.e. the void space may comprise a gas or a gas mixture.

FIG. 1 C shows an optical cored wire 1—which comprises an optical fiber 2—surrounded by a metal tube 3—and a second metal tube 4"'. The void space between the two metal tubes 5—is filled with a filler material, for example fibers from an organic material or e-glass.

Figure 2:
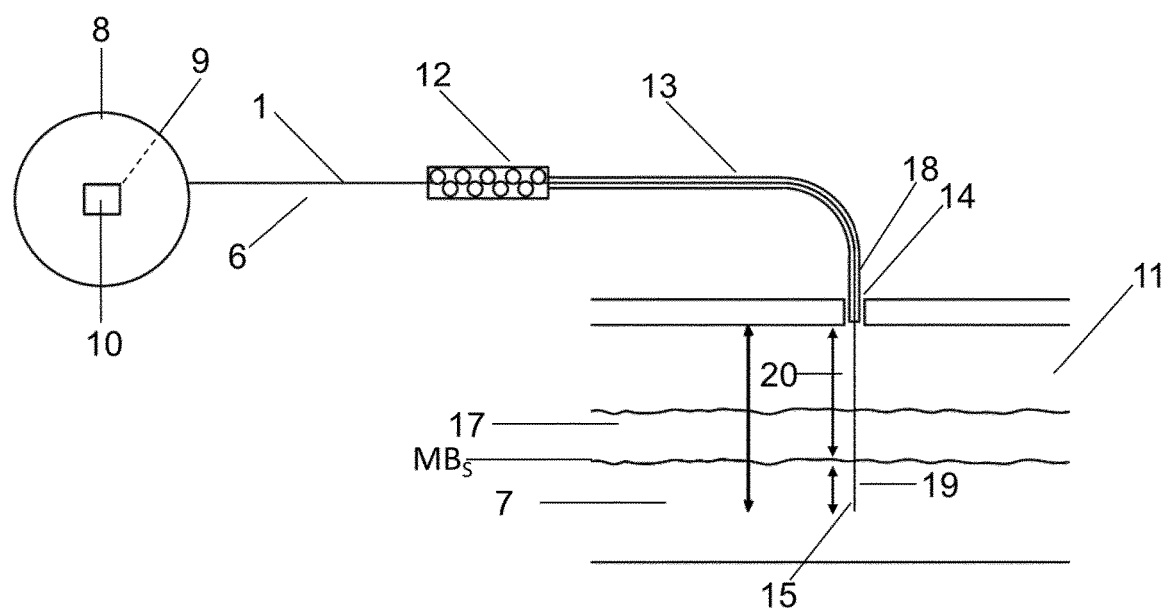
FIG. 2 shows a schematic view of an exemplary system for measuring a temperature of a molten metal bath.

FIG. 2 shows a schematic view of an exemplary system 6 for determining a temperature value of a molten metal bath 7.

The system 6 comprises an optical cored wire 1 which is located at least partly on a coil 8 and is at least in part unwound from the coil 8 for conducting a measurement. One end of the optical cored wire 9 is connected to a detector 10 which in turn could be connected to a computer system (not shown) to process the data obtained with the device 6. The molten metal bath 7 is contained in a vessel 11 which may be an electric arc furnace, a ladle, a tundish or any vessel known to those skilled in the art of molten metal processing. The optical cored wire 1 is fed by means of a feeder 12 through a guide tube 13 into the vessel 11 having an entry point 14. The configuration shown is used as an example, a roof with a respective entry point is not a prerequisite for realizing the present invention.

The configuration shown illustrates an exemplary measurement position of the optical cored wire 1 with the leading tip 15 immersed below the surface of the molten metal bath $MB_S$. The angle of immersion of the optical cored wire 1 with respect to the surface of the molten metal bath $MB_S$ is 90° in the presented embodiment. However, the angle can vary depending on the construction details of the metallurgical facility.

The temperature of a part of the optical cored wire 1 extending from the coil to the entry point of the vessel 14 can be considered to be low, which could be a temperature ranging from room temperature up to 100° C., for example. Once passing the entry point 14 in the direction of the molten metal bath 7, a hot atmosphere of up to 1700° C. or even higher is first encountered, followed by a slag layer 17 which is in turn followed by the molten metal bath 7. The slag layer 17 may be liquid, predominantly liquid or foamy. The entry point 14 to the vessel could be equipped with a blowing lance 18 to prevent metal and slag penetration into the guiding tube 13.

In order to practice the method of the present invention under different circumstances, it may be advantageous to have at least a rudimentary knowledge of the design of the vessel and the molten metal contained therein. The optimal level of the surface of the molten metal bath $MB_S$ may be approximately known for each metallurgical vessel by its design and mode of operation. In practice, the actual surface level is not a fixed value, because of changes on the contour of the vessel wall due to erosion or excessive skull or refractory build-up and/or angled operations of the vessel. There are numerous methods known to determine the level of the surface of the molten metal bath $MB_S$. For example, one can immerse a measuring bar from a position above the bath surface with a known reference point and allow it to burn away to the surface of the molten metal. The distance between the remaining bar and the reference point allows to calculate the level of the surface of the molten metal $MB_S$. The position of the surface $MB_S$ may also be determined by conductivity measurements with a suitable probe. This may also be performed in-situ, meaning that the conductive part of the optical cored wire serves as the conductivity probe. Such measurements are known in the art and do not restrict the practice of the present invention.

To determine a temperature value, the optical cored wire 1 is fed with its leading tip at the immersion end 15 towards the molten metal bath 7 to the required immersion depth. A suitable feeding system 12 will accurately control the feeding velocity of the optical cored wire 1.

After the measurement sequence, the part of the optical cored wire immersed in the molten metal bath 19 will be molten and thereby consumed. The length of this part is indicated with $L_C$.

After the temperature is determined, the part of the optical cored wire located in the hot atmosphere and extending through the slag layer 20 can be fed back into the direction of the coil 8 and can be reused for the next measurement.

Figure 3:
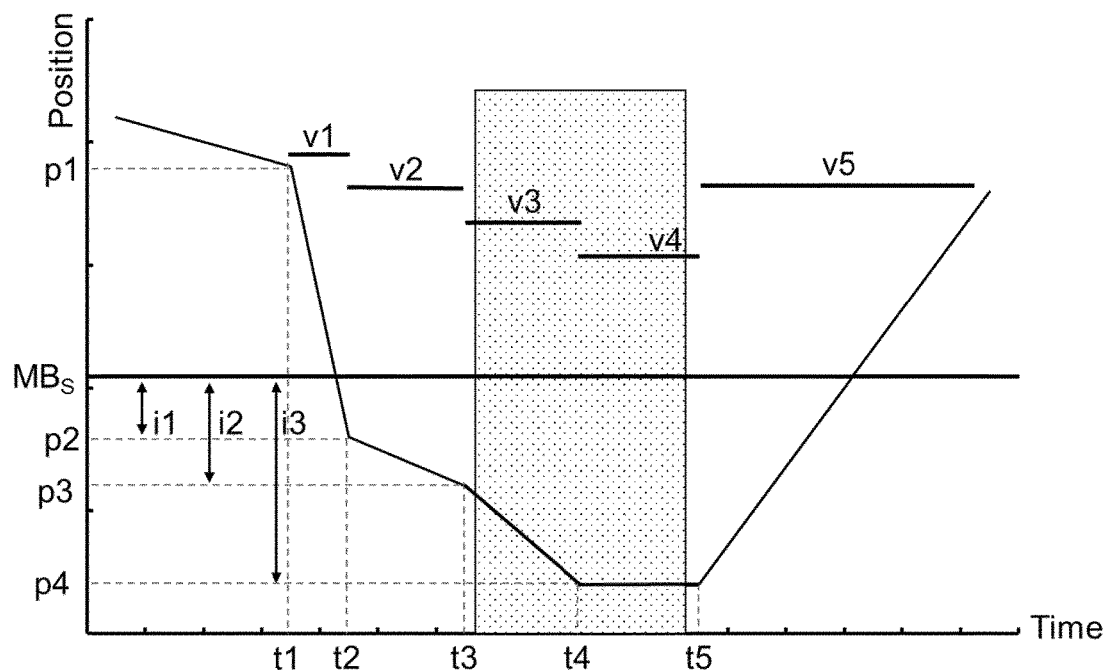
FIG. 3 shows a position vs. time graph for the leading tip of an optical cored wire according to the present invention.
Figure 4:
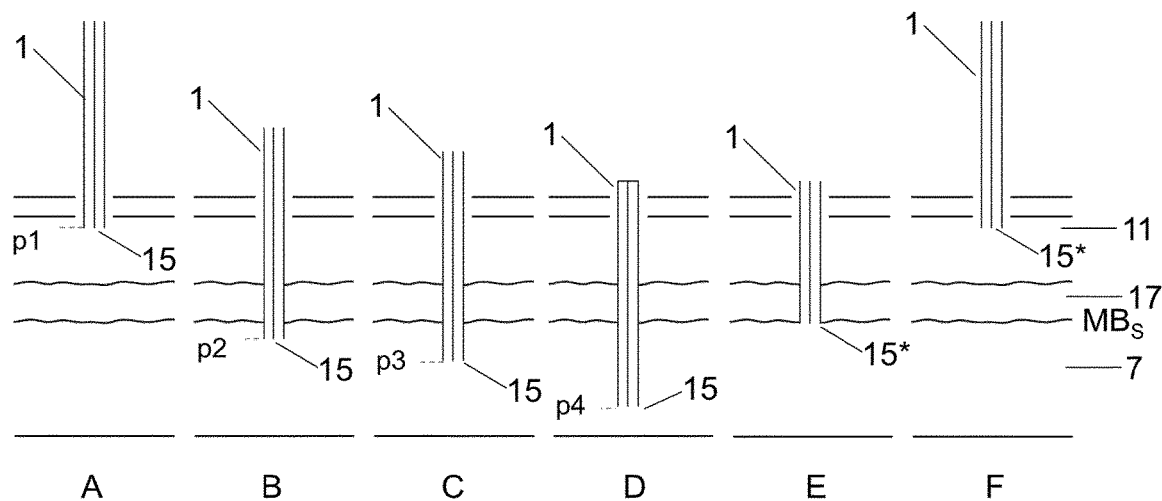
FIG. 4 shows the position of the leading tip in a representative vessel during the different steps of the inventive method.

FIG. 3 and FIG. 4 illustrate the method of the present invention in more detail. In particular, FIG. 3 illustrates the movement of the leading tip during an exemplary feeding scheme. The x-axis shows the time, whereas the y-axis indicates the position of the leading tip. The position of the surface of the molten metal bath $MB_S$ as well as the feeding velocities during the different time durations are also indicated for orientation. For the sake of clarity, acceleration and de-acceleration are neglected. The melting and devitrification behavior of the optical cored wire depends on the amount of heat transfer from the environment, which is directly related to the velocity the leading tip is fed with.

In a first step, the leading tip of the optical cored wire is positioned at a position p1. Subsequently, the optical cored wire is fed with a high speed (v1) towards and, according to a preferred embodiment, into the molten metal bath to immerse the leading tip in a certain immersion depth i1 (position p2). Tests have shown, that i1 may preferably be in the range of centimeters.

In a next step, the feeding speed is reduced to v2. The duration of the time period of this second feeding may be selected in such a way, that the outer metal tube of the optical cored wire immersed in the molten metal bath will not melt.

Afterwards, the feeding speed is increased to velocity v3 and the leading tip of the optical cored wire is fed to the deepest position in the molten metal bath p4 in immersion depth i3. Since v3 is higher than v2, an immersion depth sufficient to ensure homogeneous conditions of the molten metal bath can be reached by the leading tip.

After arriving at the deepest position p4, the feeding is preferably paused with as indicated in the shown schematic; i.e. resulting in a stationary phase. Alternatively, a slow feeding can be advantageous under certain circumstances. For the sake of clarity, a melting and decomposition process and a resulting movement of the newly developing leading tip is not shown in FIG. 3.

The temperature measurement is obtained during a measurement time period also indicated in the figure. In the shown preferred embodiment, this period timely overlaps with the third time period during which the optical cored wire is fed with v3 and with the stationary phase. Temperature values obtained in earlier feeding phases may often not be representative for the bulk temperature of the molten metal bath. Furthermore, data obtained by a damaged leading tip may be prevented.

Finally, the optical cored wire is retracted with a velocity v5 from the molten metal bath back to a position above the surface.

FIG. 4 shows an optical cored wire 1 and the position of its leading tip 15 in a representative vessel 11 during the different steps of an exemplary embodiment of the method according to the present invention in relation to a molten metal bath 7, its surface $MB_S$ and a slag layer 17.

Before the start of a measurement sequence, the leading tip of the optical cored wire may be positioned outside of the hot environment in the metallurgical container, i.e. the vessel containing the molten metal bath. Especially in cases where previous measurements have been conducted, the part of the immersion end comprising the leading tip 15 may already be damaged. It has been observed that this part of the optical cored wire cannot be used for reliable measurements in such cases. The longer the residence time during a previous measurement sequence in the thermally demanding zones, the more damage can be observed. Applying the method according to the present invention will minimize this damage.

FIG. 4A shows the leading tip 15 of the optical cored wire 1 at position p1. This may be inside the metallurgical vessel and proximate the entry point; i.e. close to the point where the optical cored wire enters the vessel.

According to a preferred embodiment, the optical cored wire is subsequently fed into the molten metal bath 7 to immerse the leading tip in a certain immersion depth i1, corresponding to position p2 as shown in FIG. 4 B. Consequently, the leading tip of the optical cored wire 15 may be in contact with the molten metal bath 7 from this point in time. Depending on the conditions of the metallurgical facility, the first immersion depth i1 can be reduced when the bath level is considered to be stable. In cases of unstable bath levels this depth may be increased. The bath level stability is depending on a variety of circumstances and can be influenced by choice of the operator or by external influences such as scrap quality.

After a subsequent feeding phase, the leading tip arrives at position p2 as shown in FIG. 4 C. During this phase, a potentially damaged part may be pre-heated within the environment of the molten metal. The undamaged part of the optical cored wire 1 may still be positioned in a thermally less demanding zone above the surface of the molten metal bath and the optical fiber may be thermally protected by its outer sheath.

Afterwards the leading tip of the optical cored wire is fed to the deepest position in the molten metal bath p4 in immersion depth i3, corresponding to the configuration shown in FIG. 4 D. Due to a pre-heating during the second feeding phase, the outer metal tube may start to melt during this third feeding with the result of building a new leading tip 15* from the undamaged part of the optical cored wire. Since the feeding velocity v3 is higher during this phase than the previous feeding velocity v2, an immersion depth sufficient to ensure homogeneous conditions of the molten metal bath can be reached by the leading tip 15. The deepest immersion depth i3 at position p4 in the liquid metal bath should be chosen larger than the temperature gradient length in the bath and is also preferred to be larger than the typical slag layer thickness. In case this is obeyed the newly formed leading tip of the optical cored wire 15* will have been exposed to the heat of the slag layer 17 only for a limited time period.

FIG. 4 E shows the position of a newly formed leading tip 15* after the stationary or nearly stationary phase of the fourth time period; i.e. a phase in which the leading tip is not actively moved or fed with a low velocity. Preferably, the optical cored wire has been consumed up to the surface of the molten metal bath. The time required for a complete consumption of the immersed part of the optical cored wire to the surface of the molten metal bath is dependent on the temperature of the molten metal and the characteristics of the optical cored wire. Since the consumption of the optical cored wire is expected to be the faster the higher the temperature of the molten metal bath, the duration of this stationary or nearly stationary phase may be the shorter the higher the expected temperature of the molten metal bath, i.e. a temperature that is assumed prior to a measurement sequence or is measured in an earlier phase of the measurement sequence. The said characteristics of the optical cored wire affecting its melting or consumption behavior include its design and the materials it is made of. For example, a metal tube with a higher wall thickness will melt slower than a metal tube of the same material with a thinner wall thickness. The chosen material will also determine the exact melting behavior, especially the melting point is a defining parameter. Furthermore, the linear density, a result of the combination of design and chosen materials, may influence the consumption behavior. For the given reasons, it can be advantageous that the parameters of the feeding scheme are adjusted to the properties of the optical cored wire used.

Finally, the optical cored wire is retracted from the molten metal bath back to a position with the leading tip 15* above the surface (FIG. 4 F).

As apparent from the above explanation, the part of the optical cored wire immersed into the molten metal bath is consumed during a measurement sequence according to the invention. The part of the optical cored wire that has been exposed to the environment inside the vessel containing the molten metal is potentially damaged and not suitable anymore to subsequent measurements.

In the following, exemplary conditions according to the inventive method will be given.

Example

An optical cored wire with a linear density of 46 g/m comprising a graded index fiber with a core diameter of 50 µm and a stainless steel tube with an outer diameter of 1.3 mm embedded in a stainless steel tube with an outer diameter of 6 mm and a wall thickness of 0.3 mm is used on a feeding system installed at an electric arc furnace in a configuration according to FIG. 2. After a specific accumulated power consumption of the electric arc furnace system or by manual input, the leading tip of the optical cored wire is positioned 120 cm above the surface of the molten metal bath. A first feeding with a velocity of 3 m/s is initiated for 0.45 s. Subsequently, the feeding is slowed down to a velocity of 0.2 m/s. For an expected temperature of the molten metal bath of 1600° C., this feeding is conducted for 0.4 s. At the end of this slow feed the damaged part of the optical cored wire is close to a melting state while the length of the cored wire positioned in the slag layer is in a preheated state. In a third phase, the feeding velocity is increased again to 2.3 m/s, positioning the leading tip 0.5 m below the surface of the molten metal bath. After arriving at this lowest immersion depth, the feeding is paused for 0.15 s. The measurement of the required data for measuring the temperature is obtained during the third fast feeding and the stationary phase. Multiple data points representing the temperature are obtained by the detector. Other measurement intervals and durations are also possible, but sufficient and most accurate temperature detection can be obtained within this interval. Finally, the optical cored wire is retracted with a velocity of 3 m/s, positioning the newly built leading tip above the surface of the molten metal bath. Relative to the total length of the optical cored wire, the position of the leading tip has moved in the direction of the end connected to the detector by the length consumed during a measuring scheme, in the described example by 0.5 m. If required, this measurement sequence can be repeated.

LIST OF REFERENCE NUMERALS 1, 1', 1'', 1''' Optical cored wire
2, 2', 2'', 2''' Optical fiber
3', 3'', 3''' Metal tube
4'', 4''' Second metal tube
5'', 5''' Void space between metal tubes
6 System
7 Molten metal bath
8 Coil
9 Opposite end (end of cored wire connected to detector)
10 Detector
11 Vessel; metallurgical container
12 Feeder
13 Guide tube
14 Entry point
15, 15* Leading tip of optical cored wire
$MB_S$ Surface of molten metal bath
17 Slag layer
18 Blowing lance
19 Part of the cored wire immersed in the molten metal bath
20 Part of cored wire subjected to hot atmosphere and slag
p1-p5 Position of leading tip during measurement sequence
v1-v5 Velocities of leading tip during measurement sequence
i1-i4 Immersion depth of leading tip during measurement sequence

The invention claimed is:

1. A method for determining a temperature value of a molten metal bath with a device comprising an optical cored wire and a detector, comprising:
   (a) providing the optical cored wire with its leading tip at a position p1 above the surface of the molten metal bath;
   (b) feeding the leading tip directed towards the molten metal bath from position p1 with a velocity v1 for a first time period from t1 to t2 to a position p2 in an immersion depth i1 below the surface of the molten metal bath;
   (c) feeding the leading tip with a velocity v2 for a second time period from t2 to t3 to a position p3 in an immersion depth i2 below the surface of the molten metal bath;
   (d) feeding the leading tip with a velocity v3 for a third time period from t3 to t4 to a position p4 in an immersion depth i3 below the surface of the molten metal bath;
   (e) either pausing with the feeding of the leading tip or feeding the leading tip with a velocity v4, each for a fourth time period from t4 to t5;
   (f) retracting the leading tip with a velocity v5 to a position above the surface of the molten metal bath after t5; and
   (g) obtaining temperature information of the molten metal bath within a measuring time period within t2 to t5, wherein the immersion depth and velocities have the following relations (i) i2>i1,
(ii) i3>i2,
(iii) v1>v2,
(iv) v2<v3 and
(v) v4≤v1 or v2 or v3.

2. The method according to claim 1, wherein the molten metal is a molten steel.

3. The method according to claim 1, wherein the optical cored wire is laterally surrounded by at least one additional metal tube.

4. The method according to claim 1, wherein the linear density of the optical cored wire is in the range of 25-80 g/m.

5. The method according to claim 1, wherein the duration of the fourth time period from t4 to t5 is selected by a method comprising:
   (i) providing a set of data relating measured data of a molten metal bath to durations;
   (ii) obtaining a measurement in a time period prior to t4; and
   (iii) selecting from the provided set of data the duration of the fourth time period corresponding to the measured data obtained during the time period prior to t4.

6. The method according to claim 5, wherein the measured data are temperature values.

7. The method according to claim 1, wherein the part of the optical cored wire being fed below the molten metal bath surface is consumed until t5.

8. The method according to claim 7, wherein the temperature measurement is obtained within a measurement time period within t3 to t5.

9. The method according to claim 1, wherein the start of the measurement time period is later than or equal to t3+(t4−t3)/2.

10. The method according to claim 1, wherein the end of the measurement time period is earlier than or equal to t4+(t5−t4)/2.

11. The method according to claim 1, wherein at least one of the durations of the first, the second, the third or the fourth time period is selected based on the characteristics of the optical cored wire.

12. The method according to claim 1, at least one of the velocities v1, v2 or v3 is selected by a method comprising:
   (i) providing sets of data relating expected temperatures of a molten metal bath to velocities for v1, v2 or v3;
   (ii) providing an expected temperature value of the molten metal bath; and
   (iii) selecting from the provided sets of data at least one of the velocities corresponding to the expected temperature.

13. The method according to claim 1, wherein the method further comprises (a1) determining the level of the surface of the molten metal bath.

14. A system for carrying out the method according to claim 1.

15. The system according to claim 14, wherein the system comprises feeding means.

* * * * *